(12) United States Patent
Naamanka et al.

(10) Patent No.: US 11,859,345 B2
(45) Date of Patent: Jan. 2, 2024

(54) FABRIC FOR A PAPER OR PULP TECHNOLOGY AND A METHOD FOR MANUFACTURING A FABRIC FOR A PAPER OR PULP TECHNOLOGY

(71) Applicant: Valmet Technologies Oy, Espoo (FI)

(72) Inventors: Jorma Naamanka, Espoo (FI); Juha Nieminen, Espoo (FI)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 17/628,147

(22) PCT Filed: Sep. 3, 2020

(86) PCT No.: PCT/FI2020/050567
§ 371 (c)(1),
(2) Date: Jan. 18, 2022

(87) PCT Pub. No.: WO2021/048464
PCT Pub. Date: Mar. 18, 2021

(65) Prior Publication Data
US 2022/0251782 A1    Aug. 11, 2022

(30) Foreign Application Priority Data
Sep. 9, 2019   (FI) ...................................... 20195744

(51) Int. Cl.
*D21F 7/10*   (2006.01)
*D21F 7/00*   (2006.01)
(Continued)

(52) U.S. Cl.
CPC ................ *D21F 7/10* (2013.01); *D21F 7/003* (2013.01); *D21F 7/083* (2013.01); *B01D 33/23* (2013.01)

(58) Field of Classification Search
CPC .......... D21F 7/10; D21F 7/083; D21F 1/0054; D21F 1/0036; D21F 7/003; D21F 1/0027;
(Continued)

(56) References Cited

U.S. PATENT DOCUMENTS 7,276,137 B2   10/2007   Best et al.
2003/0221739 A1*   12/2003   Billings ................ D21F 1/0054
                                                                    139/383 AA
(Continued)

FOREIGN PATENT DOCUMENTS

DE   102005055842 A1   5/2007
EP         1507040 A1   2/2005
(Continued)

OTHER PUBLICATIONS

International Search Report for PCT/FI2020/050567, dated Nov. 23, 2020.
(Continued)

*Primary Examiner* — Eric Hug
*Assistant Examiner* — Matthew M Eslami
(74) *Attorney, Agent, or Firm* — Stiennon & Stiennon (57) ABSTRACT

A fabric for a paper or pulp technology has a longitudinal direction (MD) and a cross direction (CMD), and a first surface (FS) and a second surface (SS) in a fabric thickness direction (TD). The fabric (1) extends in the cross direction (CMD) from a first edge (FG) to a second edge (SG). The fabric (1) has an adaptable medium comprising at least one sensor. The adaptable medium is a deformable structure that adapts to the fabric where it is inserted and may be a string or a sheet configured to detect temperature, temperature profile, wear, volatile organic compounds (VOC), humidity, pH, microbial level, organic and inorganic material content, dirt content, flow rate and flow velocity field, or pressure in
(Continued)

a nip. The invention also relates to a method for manufacturing a fabric for a paper or pulp technology.

16 Claims, 6 Drawing Sheets

(51) Int. Cl.
*D21F 7/08* (2006.01)
*B01D 33/23* (2006.01)

(58) Field of Classification Search
CPC .. D21F 1/10; D21F 7/08; B01D 33/23; B01D 33/80

See application file for complete search history.

(56) References Cited

U.S. PATENT DOCUMENTS

| | | | |
|---|---|---|---|
| 2005/0109587 A1* | 5/2005 | Best | D21F 1/0027 198/810.01 |
| 2016/0083906 A1* | 3/2016 | Hill | D21F 1/0027 162/164.1 |

FOREIGN PATENT DOCUMENTS

| | | |
|---|---|---|
| EP | 3330986 A1 | 6/2018 |
| WO | 2012085338 A1 | 6/2012 |

OTHER PUBLICATIONS

Written Opinion of the International Preliminary Examining Authority for PCT/FI2020/050567, dated Sep. 22, 2021.

* cited by examiner

FABRIC FOR A PAPER OR PULP TECHNOLOGY AND A METHOD FOR MANUFACTURING A FABRIC FOR A PAPER OR PULP TECHNOLOGY

CROSS REFERENCES TO RELATED APPLICATIONS

This application is a US national STAGE application of PCT/FI2020/050567 filed on Sep. 3, 2020, and claims priority on FI 20195744, filed Sep. 9, 2019, both of which are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a fabric for a paper or pulp technology. The fabric has a longitudinal direction and a cross direction and a first surface and a second surface in a thickness direction of the fabric. The fabric extends in the cross direction from a first edge to a second edge. The present invention also relates to a method for manufacturing a fabric for a paper or pulp technology.

One of the challenges associated with the known fabrics for a paper or pulp machine is that measurement results from the real conditions prevailing in the process are required in order to adjust the process. There are known measurement devices, but they are often either handheld devices, or measurement bars. The handheld devices form a substantial danger for employees since they have to work in a close proximity of fast running webs and rolls. Besides the above-mentioned devices, measurement sensors placed in a paper machine roll are also known. A common problem to all options is that there are no measurement methods for all interesting parameters.

SUMMARY OF THE INVENTION

An object of the present invention is thus to provide a fabric and a method so as to solve the above problems.

The invention is based on the idea of embedding an adaptable medium comprising at least one sensor in a fabric in order to get data from inside of the fabric, from the surface of the fabric, or from a close proximity of the fabric.

The fabric is for a paper or pulp technology, such as for a paper or pulp machine, or for filtration related to the paper or pulp technology, e.g. disk filters. The fabric may be a wire or a felt. The fabric is especially a felt for a press section. The felt for a press section comprises at least one fabric and at least one batt fiber layer. The felt may be impregnated with polyurethane. The impregnation may be so intense that the air permeability of the felt may be almost zero.

The felt may have to operate at a speed of 50 to 2200 m/min. The pressure in a nip, which the felt passes, may be, for example, 1 to 3 MPa, 2 to 5 MPa, 3 to 6 MPa, or 7 to 10 MPa.

The fabric has a longitudinal direction and a cross direction. The fabric may be an endless loop, or the fabric may extend in the longitudinal direction from a first end to a second end. The fabric extends from a first edge to a second edge in the cross direction of the fabric. The fabric has a first surface and a second surface in the thickness direction of the fabric.

The fabric may comprise more than one base fabric one upon the other. The base fabrics may have different structures.

In use in a papermaking machine or a like, the fabric runs as an endless loop through nips formed between rolls of the papermaking machine. The running direction of the fabric is the longitudinal direction of the fabric. Conditions prevailing in the nips are often of interest.

The fabric comprises an adaptable medium comprising at least one sensor. The adaptable medium means in this text a deformable structure that adapts to the fabric where it is inserted. The adaptable medium may be a string comprising at least one sensor, or a sheet comprising at least one sensor. The adaptable medium may comprise more than one sensor and the fabric may contain several adaptable media. Each sensor may not measure the same parameter but there may be sensors that measure various parameters. The string may be an elongated object, such as a yarn, a band, a fiber, or a filament provided with at least one sensor. The string may be of any suitable material. The string may be, for example, of metal or plastic. It is also possible that the string comprises more than one material. The string may be e.g., a metallic filament covered by a plastic sheath. The sheet may be, for example, a fabric, a net, or a membrane. The sheet may be water permeable.

The string may extend in the fabric in the longitudinal direction, in the cross direction, or randomly. The length, which the string extends in the fabric, is selected case by case. For example, the string may extend from one edge of the fabric to the other edge in the cross direction of the fabric, or a certain length in the cross direction. According to another example, the string may extend almost indefinitely in a fabric having a form of an endless loop.

The string may have a width or a diameter of less than three millimeters, for example from 1 to 3 millimeters, or 0.5 to 3 millimeters, or 0.1 to 3 millimeters. The sheet may have a thickness of less than three millimeters, for example from 1 to 3 millimeters, or 0.5 to 3 millimeters, or 0.1 to 3 millimeters.

The sensor may be attached on the surface of the adaptable medium, or it may be inside the adaptable medium. The sensor may measure various parameters in the fabric, such as temperature, temperature profile, wear, volatile organic compounds (VOC), humidity, pH, microbial level, organic and inorganic material content, dirt content, flow rate and flow velocity field, or pressure in a nip. The size of the sensor may be a few square millimeters or smaller, or it may be larger, e.g., a few square centimeters. In case of a larger sensor, it must be at least partially water permeable. It is possible that the sensor is a printed circuit printed on a textile surface, or the sensor is a strain gauge.

The sensor is configured to transmit wirelessly gathered measurement results to an external receiver. The sensor may use an antenna for transmitting data to the receiver. The measurement results may be stored in a cloud service. A user may receive the data e.g., into a mobile phone. The data may be available through the internet via a suitable software. The wireless data transmitting may be based on the radio frequency identification (RFID). Among the RFID techniques the near field communication (NFC) is of interest.

The fabric comprises machine direction yarns in the longitudinal direction and the string may be configured to extend in the machine direction. The string may be a machine direction yarn of the fabric, or it may be a separate yarn extending in the machine direction. The latter may come into question especially when the string is assembled into a ready-made fabric.

The fabric comprises cross direction yarns in the cross direction and the string may be configured to extend in the cross direction. The string may be a cross direction yarn of the fabric, or it may be a separate yarn extending in the cross direction. The latter may come into question especially when the string is assembled into a ready-made fabric.

The string may be configured to extend diagonally to the longitudinal direction and the cross direction of the fabric, or at any angle to the longitudinal direction and the cross direction of the fabric. In this case, the string is usually assembled in a ready-made fabric.

The fabric may comprise seam loops at the first end and the second end and the string may be configured to extend inside the seam loops in the cross direction of the fabric.

The fabric may comprise at least one batt fiber layer. The bat fiber layer may be on the first or second surface of the fabric or on both surfaces. The string may be configured to extend inside the batt fiber layer.

The fabric may comprise more than one fabric layer and the batt fiber layer may lie between the fabric layers. The batt fiber layer may also lie on one of the outer surfaces or on both surfaces. The string may be configured to extend inside at least one batt fiber layer.

The fabric may comprise layers of machine direction yarns one upon the other in the thickness direction of the fabric and the string may be configured to extend between the layers of the machine direction yarns.

The string may be configured to extend at least partially in the thickness direction of the fabric.

The fabric may comprise a sheet provided with at least one sensor.

The string may be assembled in the fabric during manufacturing of the fabric, or to a ready-made fabric. The string may be assembled in a ready-made fabric e.g., by a needle which may be straight or curved. The string is threaded through the eye of the needle and the string is darned inside the fabric by the needle. Further, such techniques such as sewing, injecting, gluing, weaving, winding, or printing may be used.

The string may be assembled inside the seam loops parallel to a pin connecting the seam loops, or the string may be the pin connecting the seam loops. The string may be inserted in the channel of intermeshed seam loops by a tool. The tool may be configured to thread the string or shoot or inject the string inside the channel.

The string may have a water-soluble sheath which protects the sensor during manufacturing of the fabric. The sheath dissolves in water when the fabric is in use in the papermaking machine, thus revealing the sensor for gaining data.

The string may be added to the fabric so that one or more strings are added in a liquid and the liquid is spread to the fabric, thus applying the sensors to the desired area of the fabric. The strings may be fixed to the fabric e.g., by needling or curing.

The sensor may work by an energy harvester, such as a kinetic energy harvester. The kinetic energy harvester changes kinetic energy to electric energy, which the sensor utilizes as an electric power source. The kinetic energy harvester may extract electrical power by employing one or a combination of different transduction mechanisms. Main transduction mechanisms are piezoelectric, electromagnetic and electrostatic mechanisms. The utilized kinetic energy may be, for example, vibrations of the running fabric.

Another option is that the sensor works by electric power, which is created by a magnetic field arranged outside the fabric. The magnetic field may be created, for example, by the receiver. Further, a dry-cell battery or a rechargeable battery may be used as a power source.

BRIEF DESCRIPTION OF THE DRAWINGS

In the following the invention will be described in greater detail by means of preferred embodiments with reference to the accompanying drawings.

DESCRIPTION OF THE PREFERRED EMBODIMENTS

Figure 1:
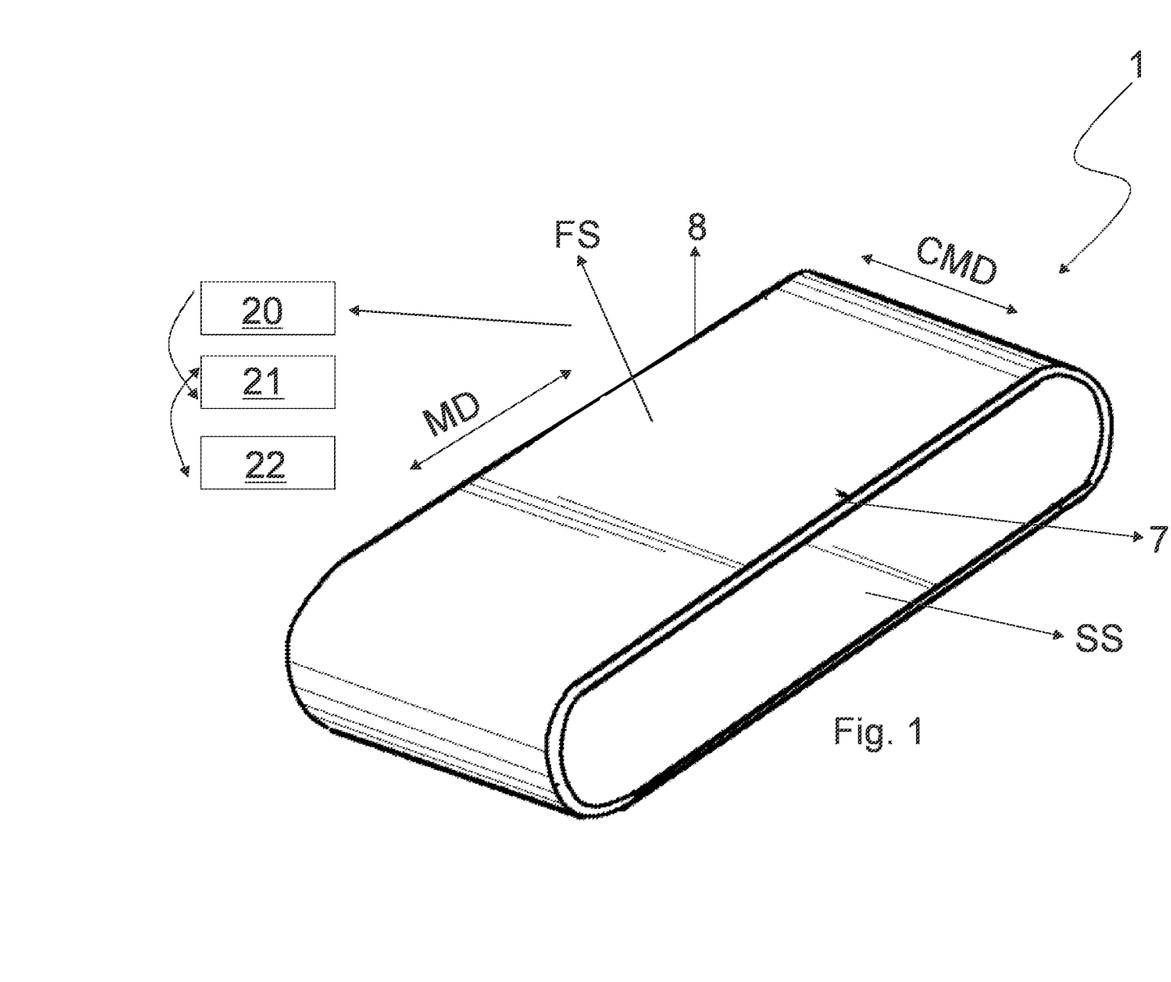
FIG. 1 is a perspective view of a fabric and a system related to it.

FIG. 1 shows a schematic view of a fabric 1. The fabric has a longitudinal direction MD, a cross direction CMD, a first surface FS and a second surface SS. The fabric 1 extends in the cross direction from a first edge 7 to a second edge 8. The fabric 1 forms in the machine direction MD an endless loop as shown in FIG. 1.

The system related to the fabric 1 may comprise a reader 20, a computer 21 and a cloud service 22. The reader 20 reads measuring results which are stored in a cloud service 22 and processed by a computer 21.

Figure 2:
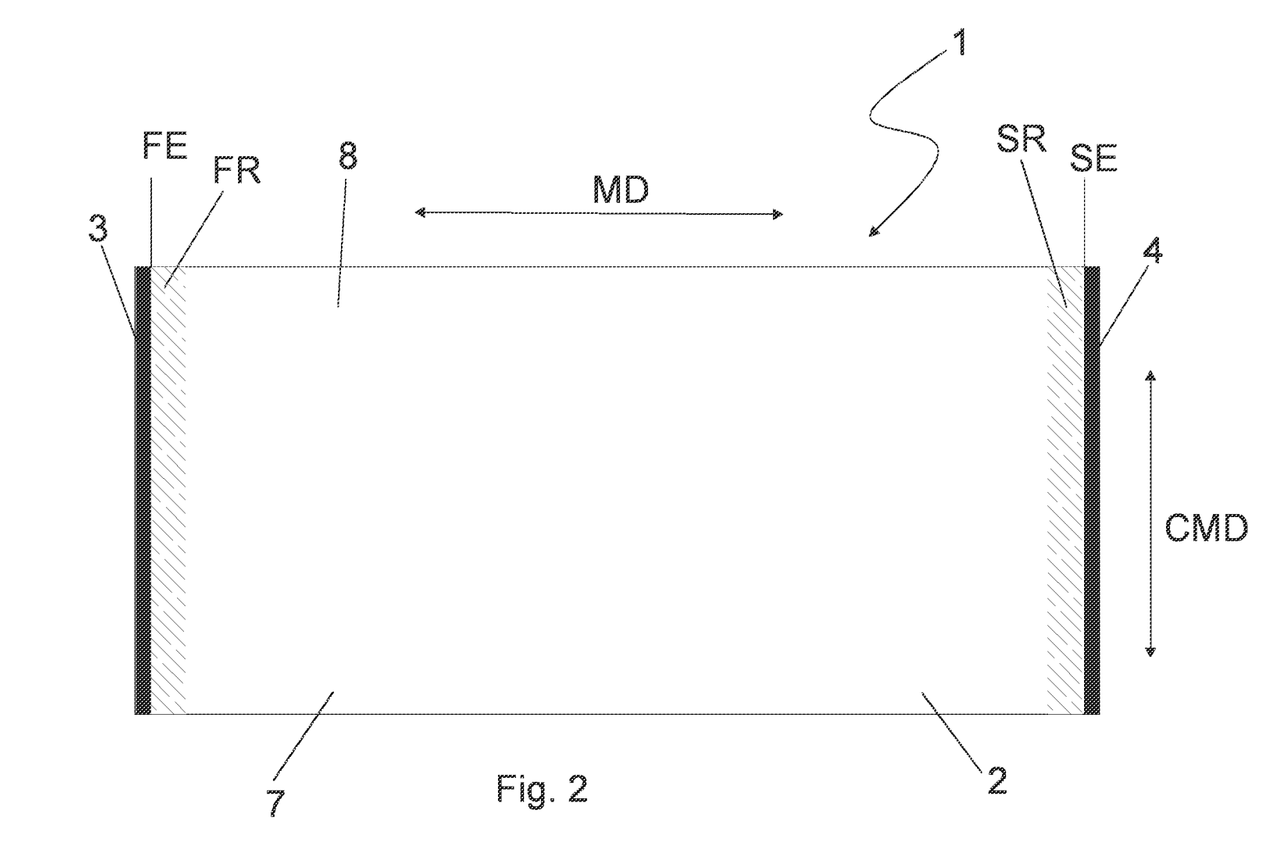
FIG. 2 is a view of a fabric from above.
Figure 3:
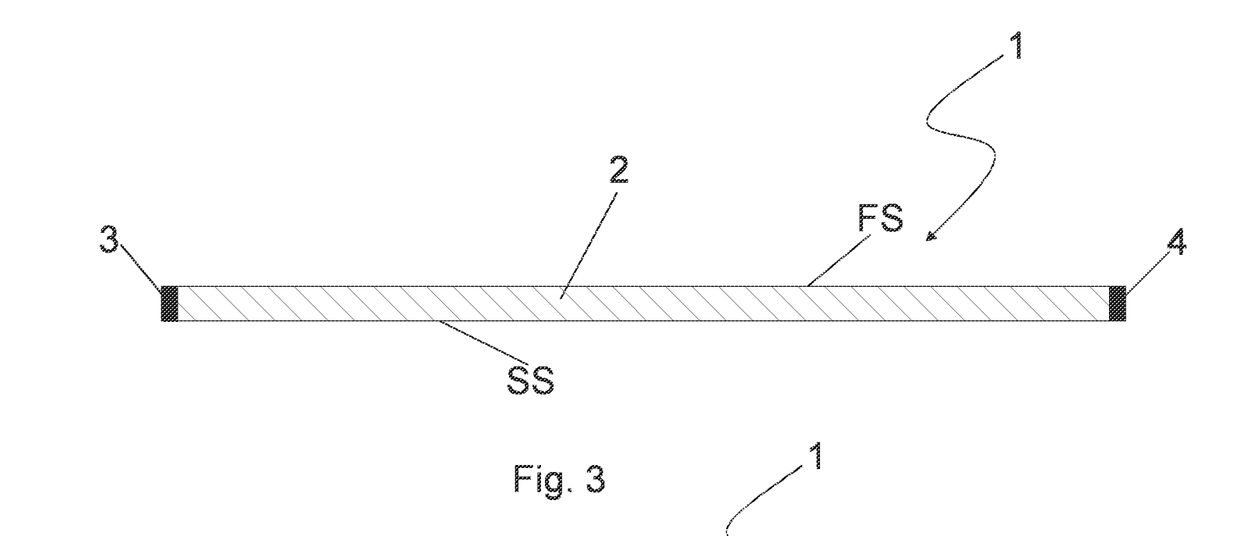
FIG. 3 is a side view of a fabric.
Figure 6:
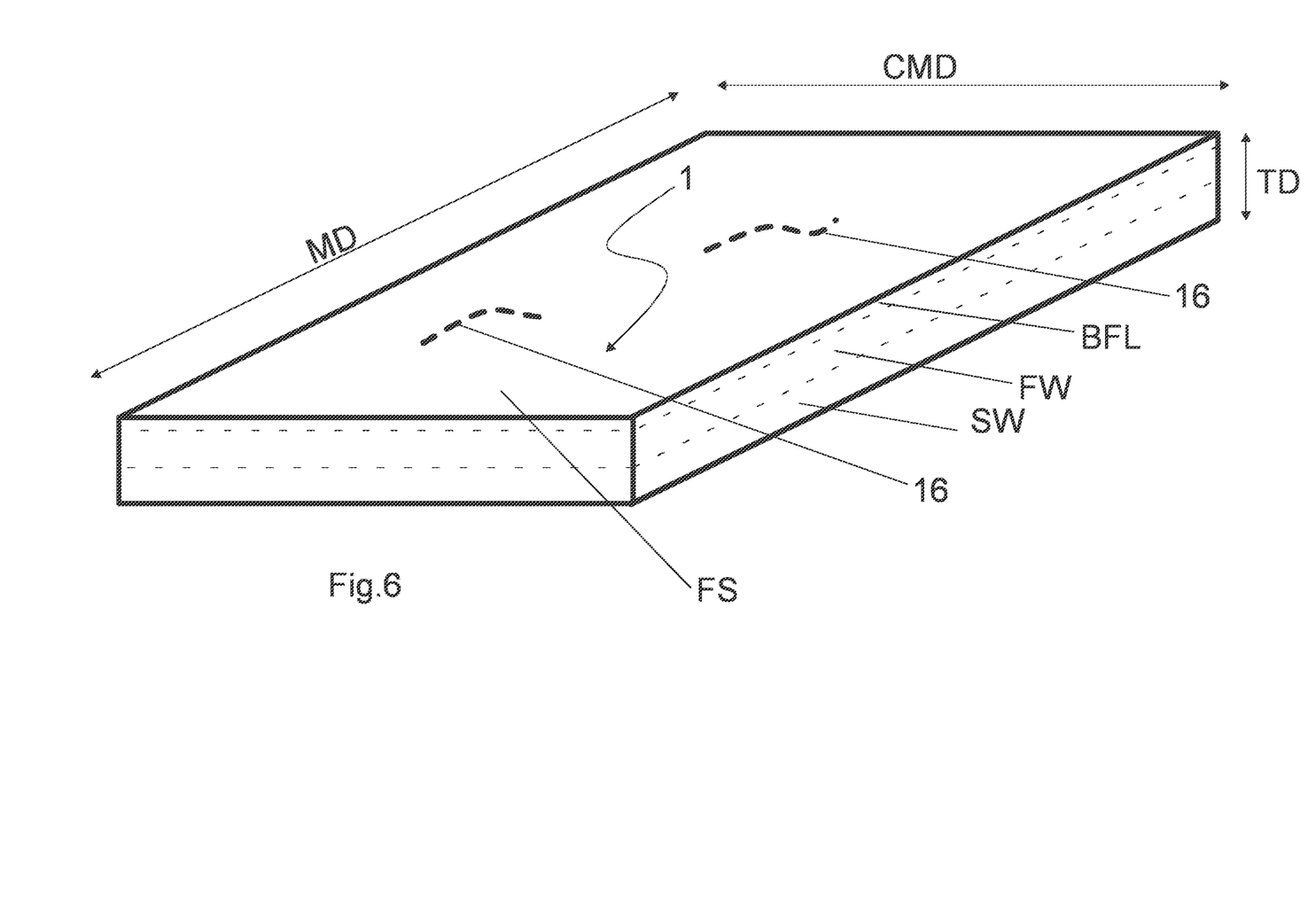
Figure 7:
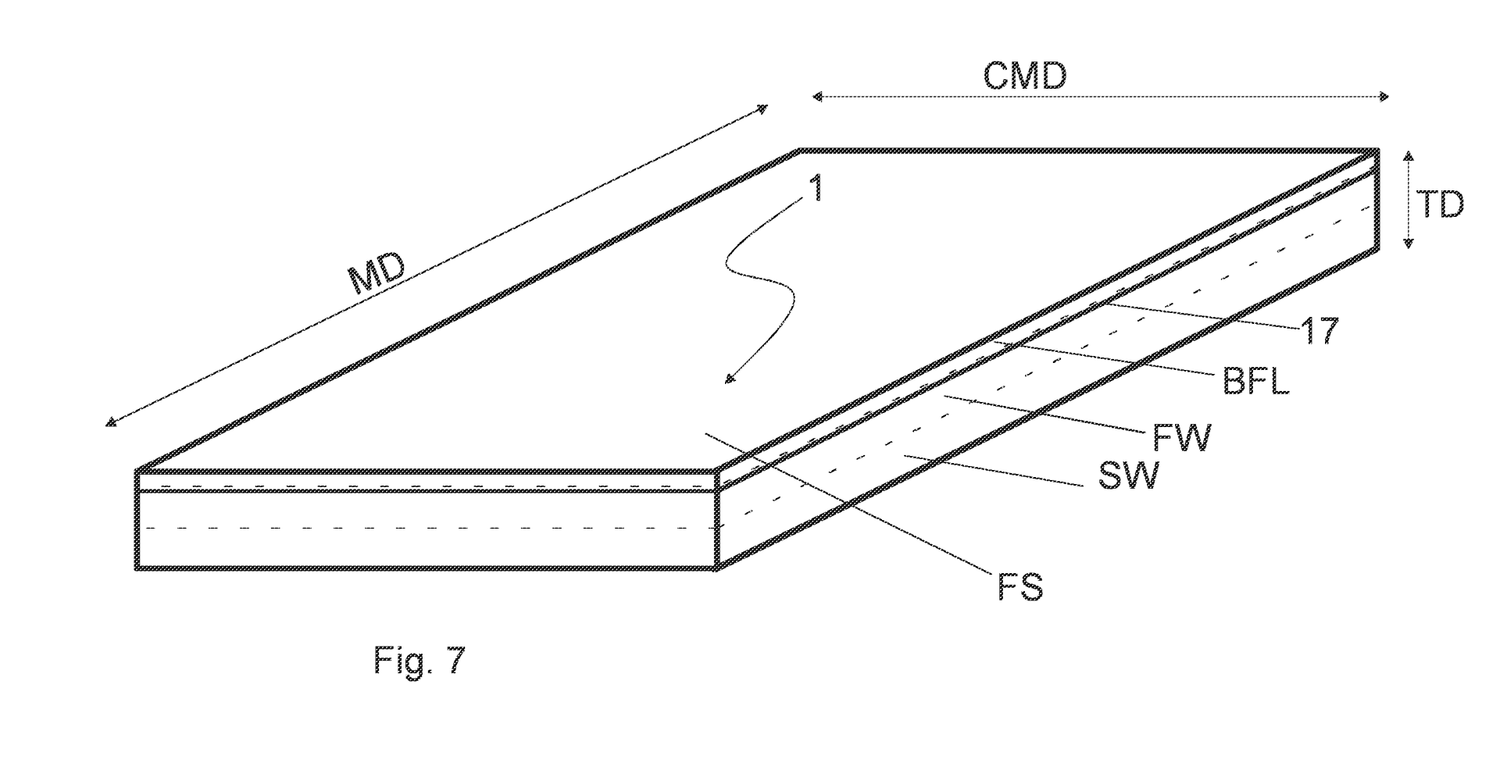

FIGS. 2 and 3 show schematic views of a fabric 1. The fabric has a longitudinal direction MD, a cross direction CMD, a first surface FS and a second surface SS. The dryer fabric 1 comprises a weave 2 and seam forming counterparts 3, 4. On one of the outer surfaces of the weave 2, or on both outer surfaces of the weave 2 may be a batt fiber layer (FIGS. 6 and 7). The batt fiber layer may also be between two weaves 2 when the fabric 1 comprises more than one weave 2 one upon the other.

As shown in FIG. 2, the weave 2 comprises a first end FE, a second end SE, a first end region FR, a second end region SR, a first edge 7 and a second edge 8. When the fabric 1 is in use in a paper or pulp machine the seam forming counterparts 3, 4 are joined together by a pin 10, as shown in FIG. 4.

Figure 4:
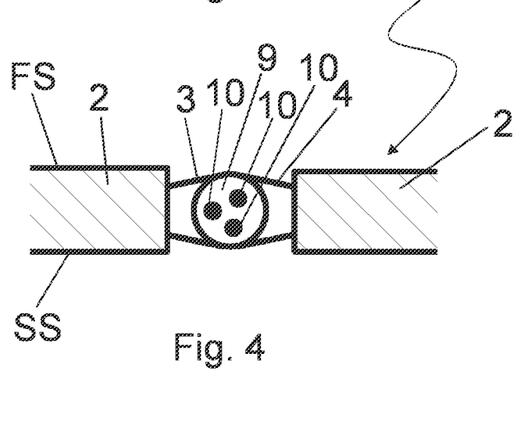
FIG. 4 is a side view of a part of a fabric.

FIG. 4 shows a cross section of the fabric 1 at the seam forming counterparts 3, 4. The seam forming counterparts 3, 4 are seam loops. The seam loops of the first end FS and the seam loops of the second end SE alternate in the seam in such a manner that a channel 9 forms in the cross direction CMD of the fabric 1. The pin 10 threaded into the channel 9 joins the ends FE, SE together.

The pin 10 may comprise a sensor, i.e., the pin 10 is a string comprising at least one sensor. Alternatively, there may be a conventional pin in the channel 9, which is accompanied by one string comprising one or more sensors, or more strings each comprising one or more sensors. The string may have a length, which corresponds to the whole width of the fabric, or the string may be shorter.

There may be a specific tool for inserting the string inside the channel 9. The tool may be configured to thread the string or shoot the string inside the channel 9.

Figure 5:
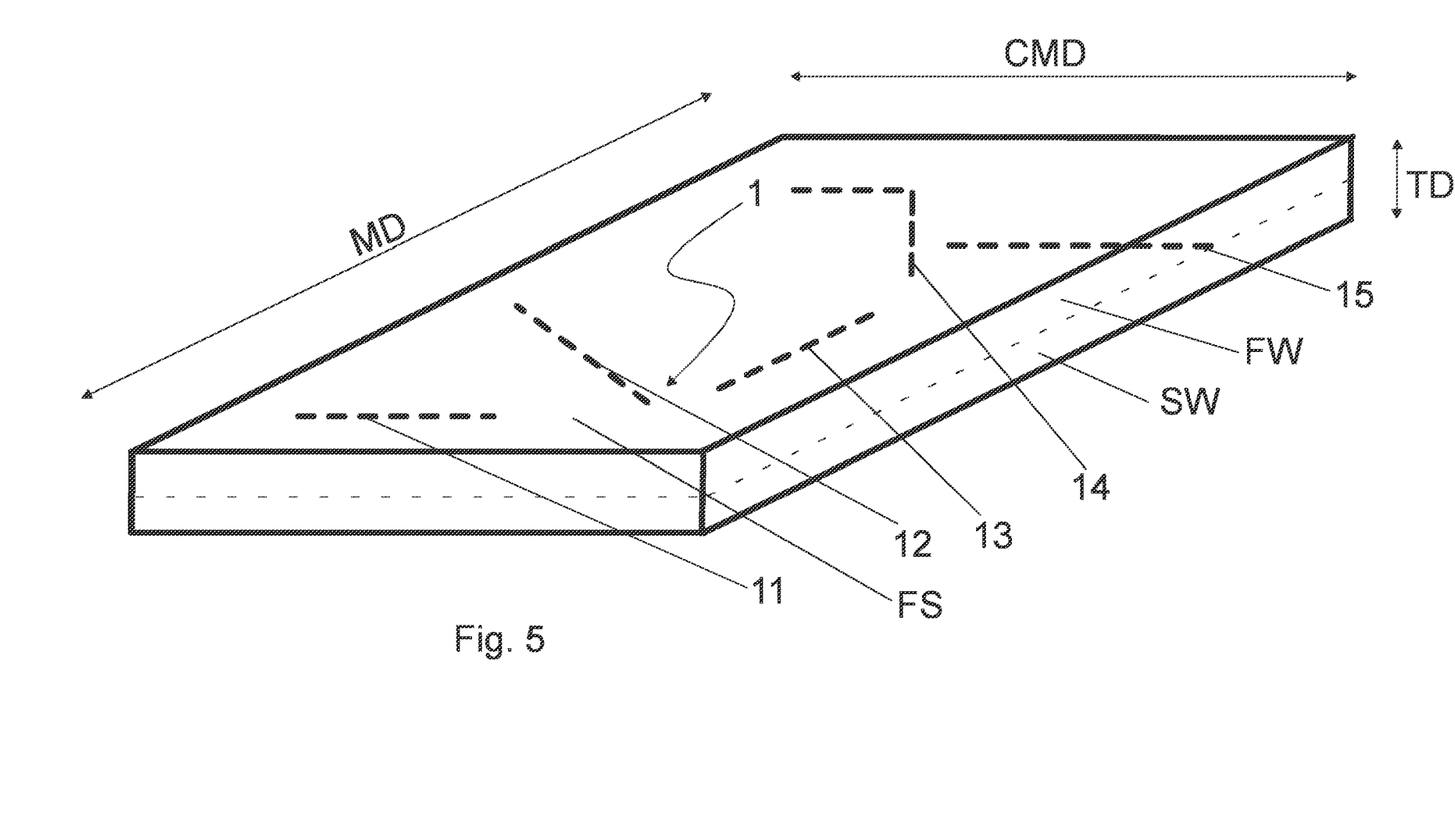
FIGS. 5 to 7 are perspective views of a fabric.

FIG. 5 shows the fabric 1 in a schematic perspective view. FIG. 5 shows how the strings may lie in the fabric 1. The fabric may comprise the spiral fabric or the weave 2. The same fabric 1 may comprise several strings either assembled in the same manner or differently. Further, the same fabric 1 may be provided with strings 16 of FIG. 6 or a sheet 17 of FIG. 7.

As shown in FIG. 5, the string 11 extends in the cross-direction CMD. The string 11 itself may be a cross directional yarn of the fabric 1, or a separate string extending in the cross direction. The separate string may be assembled in the fabric 1 by adding it to the same shed with a weft yarn during weaving of the fabric 1, or it may darned into the fabric 1 in a suitable phase after manufacturing. It is also possible that the string 11 is added to the fabric 1 at a paper or pulp machine during a stoppage. The string 12 extends in a diagonal direction in the fabric 1. The string 12 may darned into the fabric 1. The string 12 may be at any angle to the longitudinal direction MD and the cross direction CMD of the fabric 1.

The string 13 extends in the longitudinal direction MD. The string 13 itself may be a longitudinal yarn of the fabric 1, or a separate string extending in the longitudinal direction. The separate string may be assembled in the fabric 1 by darning it into the fabric 1 in a suitable phase after weaving. It is also possible that the string 13 is attached to a warp yarn so that it passes the same reed spacing as the warp yarn during weaving. Further, the string 13 may be added to the fabric 1 at a paper or pulp machine during a stoppage.

The string 14 extends partially in the thickness direction of the fabric 1. The string 14 may be added to the fabric 1 by darning.

The fabric 1 may comprise two longitudinal yarn layers one upon the other in the thickness direction TD of the fabric 1. FIG. 5 shows schematically the locations of the first longitudinal yarn layer FW and the second longitudinal yarn layer SW. The string 15 extends between the first longitudinal yarn layer FW and the second longitudinal yarn layer SW in the cross direction CMD of the fabric 1.

The fabric may comprise more than two longitudinal yarn layers one upon the other. There may be e.g., 2 to 5 yarn layers. Further, it is also possible that there are more than one layer of cross machine direction yarns. The string 15 may extend between each superimposed layers, or between some of the superimposed layers.

FIG. 6 shows a schematic perspective view of the fabric 1. The fabric 1 comprises a batt fiber layer BFL on the first side FS of the fabric 1, i.e., the fabric is a felt. The felt may be used in a press section of a paper or pulp machine. The string 16 may be one of the fibers of the batt fiber layer BFL. The string 16 may be assembled into the fabric 1 by needling. The string 16 may be randomly oriented, or it may extend e.g., in the longitudinal direction MD of the fabric 1. The string 16 may extend in the longitudinal direction of the fabric 1 in a predetermined location in such a manner that it is possible to needle the batt fiber layer BFL to the weave in such a manner that the at least one sensor remains undamaged.

FIG. 7 shows another schematic perspective view of the fabric 1. The fabric 1 may comprise a sheet 17 under the batt fiber layer BFL. The sheet 17 may cover the whole surface of the fabric 1, or only partially. The sheet 17 may be a fabric, a net, or a membrane. The sheet may be water permeable. The sheet 17 comprises one or more sensors.

It will be obvious to a person skilled in the art that, as the technology advances, the inventive concept can be implemented in various ways. The invention and its embodiments are not limited to the examples described above but may vary within the scope of the claims.

The invention claimed is:

1. A fabric for paper making or pulp making; the fabric comprising: longitudinal yarns and cross directional yarns forming a weave, the fabric having a longitudinal direction (MD) and a cross direction (CMD) and a first surface (ES) spaced from a second surface (SS) in a thickness direction, the fabric extending in the cross direction from a first edge to a second edge defining a whole width of the fabric and wherein the fabric extends in the longitudinal direction from a first end to a second end, the first end and the second end having seam forming counterparts that are joinable together by a pin; and a string comprising at least one sensor embedded in the fabric weave, wherein the string is separate from the longitudinal yarns and the cross directional yarns forming the weave of the fabric, wherein the string has a length in the cross direction which corresponds to the whole width of the fabric thereby enabling obtaining overall profiling data over an entire machine width of the fabric, allowing when something goes wrong in the process, being detected right away.

2. The fabric of claim 1 wherein the seam forming counterparts define seam loops, and wherein the string is configured to extend inside the seam loops in the cross direction of the fabric.

3. The fabric of claim 1 wherein the fabric comprises more than one layer of yarns one upon the other in the thickness direction of the fabric and the string is configured to extend between the layers of the yarns.

4. The fabric of claim 1 wherein the string is configured to extend at least partially in the thickness direction of the fabric.

5. The fabric of claim 1 wherein the at least one sensor is configured to harvest kinetic energy and use said energy as an electric power source.

6. The fabric of claim 1 further comprising at least one batt fiber layer and the fabric forms a felt for a press section.

7. A fabric and sensing system for paper making or pulp making, the system comprising: a fabric having a longitudinal direction (MD) and a cross direction (CMD), and longitudinal yarns and cross directional yarns forming a weave, the fabric having a first surface (FS) spaced from a second surface (SS) in a thickness direction, the fabric extending in the cross direction from a first edge to a second edge defining a whole width of the fabric and wherein the fabric extends in the longitudinal direction from a first end to a second end, the first end and the second end having seam forming counterparts that are joinable together by a pin; a string comprising at least one sensor embedded in the fabric weave, wherein the string is separate from the longitudinal yarns and the cross directional yarns forming the weave of the fabric and wherein the string has a length which corresponds to the whole width of the fabric thereby enabling obtaining overall profiling data over an entire machine width of the fabric, allowing when something goes wrong in the process, being detected right away, wherein the seam forming counterparts define seam loops, and wherein the string is configured to extend inside the seam loops in the cross direction of the fabric; wherein the at least one sensor being thereby positioned to produce measurement results relating to at least one aspect of the fabric and to wirelessly transmit the measurement results; a reader external to the fabric and configured to receive the measurement results wirelessly transmitted by the at least one sensor; and a computer which processes the received measurement results and sends them to a cloud service which stores the measurement results.

8. The system of claim 7 wherein the at least one sensor is configured to measure parameters in the fabric selected from the group consisting of temperature, temperature profile, wear, volatile organic compounds (VOC), humidity, pH, microbial level, organic and inorganic material content, dirt content, flow rate and flow velocity field, and pressure in a nip.

9. A method for manufacturing a fabric assembly for a paper making or pulp making, the fabric assembly having a longitudinal direction and a cross direction and a first surface and a second surface in a thickness direction of the fabric, the fabric assembly extending in the cross direction from a first edge to a second edge defining a whole width of the fabric and the fabric extending in the longitudinal direction from a first end to a second end, the first end and the second end comprising seam forming counterparts that are joinable together by a pin, the method comprising: beginning with a fabric comprising machine direction yarns and cross machine direction yarns forming a weave, and then fitting to the ready-made fabric a string comprising at least one sensor in the fabric, the string being separate from the machine direction yarns and the cross machine direction yarns forming the weave of the fabric the string having a length in the cross direction which corresponds to the whole width of the fabric thereby enabling obtaining overall profiling data over an entire machine width of the fabric, allowing when something goes wrong in the process, being detected right away.

10. The method of claim 9, wherein fitting of the string in the weave of the fabric comprises carrying out an action selected from the group consisting of darning, threading, shooting, applying in a liquid, sewing, injecting, weaving, or winding.

11. The method of claim 9 wherein the step of fitting the string to the ready-made fabric comprises threading the string through the eye of a needle and then darning the string inside the ready-made fabric by the needle.

12. The fabric of claim 2 wherein the string is assembled inside the seam loops parallel to a pin connecting the seam loops.

13. The fabric of claim 2 wherein the string comprises a pin which connects the seam loops.

14. The method of claim 9 wherein the step of fitting the string to the ready-made fabric comprises inserting the string by a tool within a channel defined by the seam counterparts.

15. The method of claim 14 wherein the step of inserting the string by a tool comprises threading the string inside the channel.

16. The method of claim 14 wherein the step of inserting the string by a tool comprises shooting or injecting the string inside the channel.

* * * * *